US011586356B1

(12) United States Patent
Rao et al.

(10) Patent No.: US 11,586,356 B1
(45) Date of Patent: Feb. 21, 2023

(54) MULTI-PATH LAYER CONFIGURED FOR DETECTION AND MITIGATION OF LINK PERFORMANCE ISSUES IN A STORAGE AREA NETWORK

(71) Applicant: Dell Products L.P., Round Rock, TX (US)

(72) Inventors: Vinay G. Rao, Bangalore (IN); Madhu Tarikere, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/486,168

(22) Filed: Sep. 27, 2021

(51) Int. Cl.
G06F 3/06 (2006.01)

(52) U.S. Cl.
CPC ............ *G06F 3/0613* (2013.01); *G06F 3/067* (2013.01); *G06F 3/0619* (2013.01); *G06F 3/0635* (2013.01); *G06F 3/0659* (2013.01)

(58) Field of Classification Search
CPC ...... G06F 3/0613; G06F 3/0619; G06F 3/067; G06F 3/0635; G06F 3/0659
See application file for complete search history.

(56) References Cited

U.S. PATENT DOCUMENTS

| 6,567,397 | B1 | 5/2003 | Campana et al. |
| 6,687,746 | B1 | 2/2004 | Shuster et al. |
| 6,697,875 | B1 | 2/2004 | Wilson |
| 7,003,527 | B1 | 2/2006 | Lavallee et al. |
| 7,275,103 | B1 | 9/2007 | Thrasher et al. |
| 7,397,788 | B2 | 7/2008 | Mies et al. |
| 7,454,437 | B1 | 11/2008 | Lavallee et al. |

(Continued)

FOREIGN PATENT DOCUMENTS

| CN | 103677927 B | 2/2017 |
| EP | 1117028 A2 | 7/2001 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Mark A Giardino, Jr.
(74) *Attorney, Agent, or Firm* — Ryan, Mason & Lewis, LLP

(57) ABSTRACT

A processing device controls delivery of input-output (IO) operations from a host device to a storage system over selected paths through a network, and maintains counts of IO operations for each of a plurality of initiator-target pairs, the initiators being implemented on the host device and the targets being implemented on the storage system, each initiator-target pair being associated with a corresponding subset of the paths. Responsive to detection of at least a threshold number of errors relating to the IO operations for a given one of the initiator-target pairs, the processing device determines whether or not the detected errors satisfy one or more specified conditions based at least in part on the maintained count for that initiator-target pair, and responsive to the detected errors for the given initiator-target pair satisfying the one or more specified conditions, the processing device updates link performance issue information for the given initiator-target pair.

20 Claims, 5 Drawing Sheets

(56) References Cited

U.S. PATENT DOCUMENTS

| | | | |
|---|---|---|---|
| 7,617,292 | B2 | 11/2009 | Moore et al. |
| 7,668,981 | B1 | 2/2010 | Nagineni et al. |
| 7,770,053 | B1 | 8/2010 | Bappe et al. |
| 7,809,912 | B1 | 10/2010 | Raizen et al. |
| 7,818,428 | B1 | 10/2010 | Lavallee et al. |
| 7,890,664 | B1 | 2/2011 | Tao et al. |
| 7,904,681 | B1 | 3/2011 | Bappe et al. |
| 7,925,872 | B2 | 4/2011 | Lai et al. |
| 8,051,335 | B1* | 11/2011 | Reimers .............. G06F 3/067 |
| | | | 714/48 |
| 8,250,256 | B2 | 8/2012 | Ghosalkar et al. |
| 8,285,825 | B1 | 10/2012 | Nagaraj et al. |
| 8,819,307 | B1 | 8/2014 | Raizen et al. |
| 8,825,919 | B1* | 9/2014 | Lim .............. H04L 43/00 |
| | | | 710/33 |
| 8,832,334 | B2 | 9/2014 | Okita |
| 8,874,746 | B1 | 10/2014 | Gonzalez |
| 8,959,249 | B1 | 2/2015 | Love |
| 9,026,694 | B1 | 5/2015 | Davidson et al. |
| 9,201,803 | B1 | 12/2015 | Derbeko et al. |
| 9,400,611 | B1 | 7/2016 | Raizen |
| 9,430,368 | B1 | 8/2016 | Derbeko et al. |
| 9,594,780 | B1 | 3/2017 | Esposito et al. |
| 9,647,933 | B1 | 5/2017 | Tawri et al. |
| 9,672,160 | B1 | 6/2017 | Derbeko et al. |
| 9,712,613 | B2 | 7/2017 | Balasubramanian et al. |
| 9,778,852 | B1 | 10/2017 | Marshak et al. |
| 10,289,325 | B1 | 5/2019 | Bono |
| 10,353,714 | B1 | 7/2019 | Gokam et al. |
| 10,439,878 | B1 | 10/2019 | Tah et al. |
| 10,474,367 | B1 | 11/2019 | Mallick et al. |
| 10,476,960 | B1 | 11/2019 | Rao et al. |
| 10,521,369 | B1 | 12/2019 | Mallick et al. |
| 10,523,513 | B2 | 12/2019 | Bennett et al. |
| 10,606,496 | B1 | 3/2020 | Mallick et al. |
| 10,637,917 | B2 | 4/2020 | Mallick et al. |
| 10,652,206 | B1 | 5/2020 | Pusalkar et al. |
| 10,754,572 | B2 | 8/2020 | Kumar et al. |
| 10,757,189 | B2 | 8/2020 | Mallick et al. |
| 10,764,371 | B2 | 9/2020 | Rao et al. |
| 10,789,006 | B1 | 9/2020 | Gokam et al. |
| 10,817,181 | B2 | 10/2020 | Mallick et al. |
| 10,838,648 | B2 | 11/2020 | Sharma et al. |
| 10,880,217 | B2 | 12/2020 | Mallick et al. |
| 10,884,935 | B1 | 1/2021 | Doddaiah |
| 10,911,402 | B2 | 2/2021 | Pusalkar et al. |
| 10,999,208 | B2* | 5/2021 | Zhou .............. H04L 47/34 |
| 11,050,660 | B2 | 6/2021 | Rao et al. |
| 11,093,155 | B2 | 8/2021 | Anchi et al. |
| 11,106,381 | B2 | 8/2021 | Rao et al. |
| 11,436,123 | B2* | 9/2022 | Kleiner .............. G06F 11/3495 |
| 2001/0054093 | A1 | 12/2001 | Iwatani |
| 2002/0023151 | A1 | 2/2002 | Iwatani |
| 2002/0103923 | A1 | 8/2002 | Cherian et al. |
| 2003/0179227 | A1 | 9/2003 | Ahmad et al. |
| 2003/0195956 | A1 | 10/2003 | Bramhall et al. |
| 2003/0208581 | A1 | 11/2003 | Behren et al. |
| 2004/0010563 | A1 | 1/2004 | Forte et al. |
| 2004/0057389 | A1 | 3/2004 | Klotz et al. |
| 2004/0073648 | A1 | 4/2004 | Tanino et al. |
| 2004/0081186 | A1 | 4/2004 | Warren et al. |
| 2006/0026346 | A1 | 2/2006 | Kadoiri et al. |
| 2006/0036736 | A1 | 2/2006 | Kitamura et al. |
| 2006/0106819 | A1 | 5/2006 | Dhanadevan et al. |
| 2006/0129876 | A1 | 6/2006 | Uemura |
| 2006/0277383 | A1 | 12/2006 | Hayden et al. |
| 2007/0174849 | A1 | 7/2007 | Cheung et al. |
| 2007/0239989 | A1 | 10/2007 | Barnett et al. |
| 2007/0242617 | A1 | 10/2007 | Ichimura |
| 2007/0294563 | A1 | 12/2007 | Bose |
| 2008/0043973 | A1 | 2/2008 | Lai et al. |
| 2008/0147893 | A1 | 6/2008 | Marripudi et al. |
| 2008/0201458 | A1 | 8/2008 | Salil |
| 2008/0244174 | A1 | 10/2008 | Abouelwafa et al. |
| 2008/0301332 | A1 | 12/2008 | Butler et al. |
| 2009/0006780 | A1 | 1/2009 | Sato et al. |
| 2009/0259749 | A1 | 10/2009 | Barrett et al. |
| 2009/0282135 | A1 | 11/2009 | Ravindran et al. |
| 2010/0050022 | A1* | 2/2010 | Komatsu .............. G06F 11/201 |
| | | | 714/E11.206 |
| 2010/0131950 | A1 | 5/2010 | Yamada et al. |
| 2010/0313063 | A1 | 12/2010 | Venkataraja et al. |
| 2011/0161520 | A1 | 6/2011 | Horiuchi et al. |
| 2011/0197027 | A1 | 8/2011 | Balasubramanian et al. |
| 2011/0296230 | A1 | 12/2011 | Chen et al. |
| 2012/0102369 | A1 | 4/2012 | Hiltunen et al. |
| 2012/0124414 | A1* | 5/2012 | Dallas .............. G06F 11/2005 |
| | | | 714/E11.095 |
| 2012/0163374 | A1 | 6/2012 | Shah et al. |
| 2012/0246345 | A1 | 9/2012 | Contreras et al. |
| 2012/0254673 | A1* | 10/2012 | Sampei .............. G06F 11/0775 |
| | | | 714/48 |
| 2013/0019001 | A1 | 1/2013 | Winokur |
| 2013/0046892 | A1 | 2/2013 | Otani |
| 2013/0117766 | A1 | 5/2013 | Bax et al. |
| 2013/0121161 | A1 | 5/2013 | Szabo et al. |
| 2013/0339551 | A1 | 12/2013 | Flanagan et al. |
| 2014/0105068 | A1 | 4/2014 | Xu |
| 2015/0089015 | A1 | 3/2015 | Rosset et al. |
| 2015/0222705 | A1 | 8/2015 | Stephens |
| 2015/0242134 | A1 | 8/2015 | Takada et al. |
| 2015/0319245 | A1 | 11/2015 | Nishihara et al. |
| 2016/0050277 | A1 | 2/2016 | Kirk et al. |
| 2016/0092136 | A1 | 3/2016 | Balakrishnan et al. |
| 2016/0117113 | A1 | 4/2016 | Li et al. |
| 2016/0246749 | A1 | 8/2016 | Kobashi |
| 2016/0335003 | A1 | 11/2016 | Ahmed et al. |
| 2016/0380804 | A1 | 12/2016 | Amano |
| 2017/0134220 | A1 | 5/2017 | Chen et al. |
| 2017/0220406 | A1 | 8/2017 | Parnell et al. |
| 2017/0235507 | A1 | 8/2017 | Sinha et al. |
| 2018/0004425 | A1 | 1/2018 | Suzuki |
| 2018/0026863 | A1 | 1/2018 | Hughes et al. |
| 2018/0189635 | A1 | 7/2018 | Olarig et al. |
| 2018/0253256 | A1 | 9/2018 | Bharadwaj |
| 2018/0317101 | A1 | 11/2018 | Koue |
| 2019/0020603 | A1 | 1/2019 | Subramani et al. |
| 2019/0095299 | A1 | 3/2019 | Liu et al. |
| 2019/0108888 | A1 | 4/2019 | Sarkar et al. |
| 2019/0319846 | A1 | 10/2019 | Dhanadevan et al. |
| 2019/0334987 | A1 | 10/2019 | Mallick et al. |
| 2020/0021653 | A1 | 1/2020 | Rao et al. |
| 2020/0021654 | A1 | 1/2020 | Rao et al. |
| 2020/0097203 | A1 | 3/2020 | Mallick et al. |
| 2020/0106698 | A1 | 4/2020 | Rao et al. |
| 2020/0110552 | A1 | 4/2020 | Kumar et al. |
| 2020/0112608 | A1 | 4/2020 | Patel et al. |
| 2020/0192588 | A1 | 6/2020 | Kumar et al. |
| 2020/0204475 | A1 | 6/2020 | Mallick et al. |
| 2020/0204495 | A1 | 6/2020 | Mallick et al. |
| 2020/0213274 | A1 | 7/2020 | Pusalkar et al. |
| 2020/0241890 | A1 | 7/2020 | Mallick et al. |
| 2020/0314218 | A1 | 10/2020 | Kumar et al. |
| 2020/0348860 | A1 | 11/2020 | Mallick et al. |
| 2020/0348861 | A1 | 11/2020 | Marappan et al. |
| 2020/0348869 | A1 | 11/2020 | Gokam |
| 2020/0349094 | A1 | 11/2020 | Smith et al. |
| 2020/0363985 | A1 | 11/2020 | Gokam et al. |
| 2020/0372401 | A1 | 11/2020 | Mallick et al. |
| 2021/0019054 | A1 | 1/2021 | Anchi et al. |
| 2021/0026551 | A1 | 1/2021 | Tidke et al. |
| 2021/0026650 | A1 | 1/2021 | Rao et al. |
| 2021/0157502 | A1 | 5/2021 | Rao et al. |
| 2021/0181965 | A1 | 6/2021 | Anchi et al. |
| 2022/0137830 | A1* | 5/2022 | Garrett, Jr ............ G06F 3/0683 |
| | | | 714/6.2 |

FOREIGN PATENT DOCUMENTS

EP 2667569 A1 11/2013
WO PCT/US2019/052549 12/2019

(56) References Cited

FOREIGN PATENT DOCUMENTS

| WO | PCT/US2019/053204 | 12/2019 |
|----|-------------------|---------|
| WO | PCT/US2019/053473 | 12/2019 |
| WO | PCT/US2019/067144 | 5/2020  |

OTHER PUBLICATIONS

NVM Express, "NVM Express, Revision 1.3," NVM Express, May 1, 2017, 282 pages.
VMWARE, "Multipathing Configuration for Software iSCSI Using Port Binding," Technical White Paper, Apr. 25, 2012, 15 pages.
Dell EMC, "Dell EMC SC Series Storage: Microsoft Multipath I/O," Dell EMC Engineering, Jun. 2017, 56 pages.
Dell EMC, "Dell EMC PowerPath Family: PowerPath and PowerPath/VE Multipathing," Data Sheet, 2017, 3 pages.
EMC, "EMC PowerPath and PowerPath/VE Family for Windows," Installation and Administration Guide, Oct. 2018, 102 pages.
EMC, "EMC Powerpath Load Balancing and Failover", Comparison with native MPIO operating system solutions, Feb. 2011, 28 pages.
Dell EMC, "PowerMax OS," Dell EMC PowerMax Family Product Guide, May 2019, 192 pages.
Dell EMC, "Dell EMC SC Series Storage and Microsoft Multipath I/O," CML 1004, Jul. 2018, 36 pages.
VMWARE, Inc. "VMware VMFS Volume Management," 2009, 8 pages.
Dell EMC, "Dell EMC Unity: Virtualization Integration," Technical White Paper, Oct. 2019, 39 pages.
Dell EMC, "Dell EMC PowerMax: iSCSI Implementation for Dell EMC Storage Arrays Running PowerMaxOS," Technical White Paper, Sep. 2019, 35 pages.
Wikipedia, "Fibre Channel Zoning," https://en.wikipedia.org/wiki/Fibre_Channel_zoning, Aug. 19, 2020, 2 pages.
E. Smith, "Introducing Target Driven Zoning (TDZ)" https://brasstacksblog.typepad.com/brass-tacks/2012/01/introducing-target-driven-zoning-tdz.html, Jan. 16, 2012, 9 pages.
Broadcom, "Fabric Operating System 9.0," Technical Brief, Fabric Notifications, FOS-90-Fabric-Notifications-OT101, Nov. 4, 2020, 12 pages.
Brocade, "Brocade Guide to Undertanding Zoning," vol. 1, 2002, 27 pages.
A. Wasson, "General Rules and Limits for Auto-Provisioning on Symmetric VMAX," http://community.emc.com/docs/DOC-16553, May 8, 2012, 2 pages.
U.S. Appl. No. 17/151,302 filed in the name of Vinay G. Rao et al., filed Jan. 18, 2021, and entitled "Multi-Path Layer Configured for Detection and Mitigation of Slow Drain Issues in a Storage Area Network."

* cited by examiner

FIG. 4

MPIO DATA STRUCTURE FOR INITIATOR-TARGET PAIR *i*

| IO ERROR 1 | LUN ID AND OTHER INFORMATION CHARACTERIZING ERROR |
| IO ERROR 2 | LUN ID AND OTHER INFORMATION CHARACTERIZING ERROR |
| ... | ... |
| IO ERROR P | LUN ID AND OTHER INFORMATION CHARACTERIZING ERROR |

LINK PERFORMANCE ISSUE STATUS FOR INITIATOR-TARGET PAIR *i*

400

MULTI-PATH LAYER CONFIGURED FOR DETECTION AND MITIGATION OF LINK PERFORMANCE ISSUES IN A STORAGE AREA NETWORK

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by host devices to access the logical storage volumes or other logical storage devices of the storage system, including by way of example Small Computer System Interface (SCSI) access protocols and Non-Volatile Memory Express (NVMe) access protocols. In these and other storage systems, problems can arise when paths from one or more of the host devices to the storage system experience link performance issues. For example, such link performance issues can include "flaky" links that exhibit intermittent IO failures, possibly attributable to hardware problems in a storage area network (SAN). These and other link performance issues can lead to excessive IO retries, thereby degrading application performance.

SUMMARY

Illustrative embodiments disclosed herein provide techniques for detection and mitigation of link performance issues. In some embodiments, the techniques are implemented at least in part in a multi-path layer of at least one host device configured to communicate over a network with one or more storage arrays or other types of storage systems. One or more such embodiments can accurately and efficiently detect "flaky" links that exhibit intermittent IO failures attributable to hardware problems in a SAN, and can additionally or alternative detect other link performance issues.

The multi-path layer illustratively comprises at least one multi-path input-output (MPIO) driver configured to process IO operations of at least one host device that communicates with one or more storage arrays or other types of storage systems over designated paths through a SAN or other type of network.

Other types of host drivers or other host device components can be used in place of or in addition to one or more MPIO drivers in implementing functionality for detection and mitigation of link performance issues as disclosed herein.

In one embodiment, an apparatus comprises at least one processing device that includes a processor and a memory, with the processor being coupled to the memory. The at least one processing device is configured to control delivery of IO operations from a host device to a storage system over selected ones of a plurality of paths through a network, and to maintain counts of IO operations for each of a plurality of initiator-target pairs, the initiators being implemented on the host device and the targets being implemented on the storage system, each initiator-target pair being associated with a corresponding subset of the plurality of paths. Responsive to detection of at least a threshold number of errors relating to the IO operations for a given one of the initiator-target pairs, the at least one processing device determines whether or not the detected errors satisfy one or more specified conditions based at least in part on the maintained count for that initiator-target pair, and responsive to the detected errors for the given initiator-target pair satisfying the one or more specified conditions, the at least one processing device updates link performance issue information for the given initiator-target pair. Delivery of additional IO operations from the host device to the storage system is controlled based at least in part on the updated link performance issue information.

The at least one processing device illustratively comprises at least a portion of the host device. Other embodiments can include multiple host devices, with each such host device implementing similar functionality.

In some embodiments, the initiators of the initiator-target pairs illustratively comprise respective host bus adaptors (HBAs) of the host device and the targets of the initiator-target pairs illustratively comprise respective storage array ports of the storage system. Other types of initiators and targets can be used in other embodiments.

In some embodiments, the at least one processing device comprises at least one MPIO driver implemented in the host device and configured to control delivery of IO operations to storage devices of the storage system over selected ones of the plurality of paths through the network. For example, the MPIO driver is illustratively configured to perform at least a portion of the maintaining counts of IO operations for each of the plurality of initiator-target pairs, the determining whether or not the detected errors satisfy one or more specified conditions, and the updating link performance issue information for the given initiator-target pair, and possibly additional or alternative functionality.

These and other illustrative embodiments include, without limitation, apparatus, systems, methods and computer program products comprising processor-readable storage media.

BRIEF DESCRIPTION OF THE DRAWINGS

FIG. 4 shows an example data structure utilized in implementing detection and mitigation of link performance issues in an illustrative embodiment.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
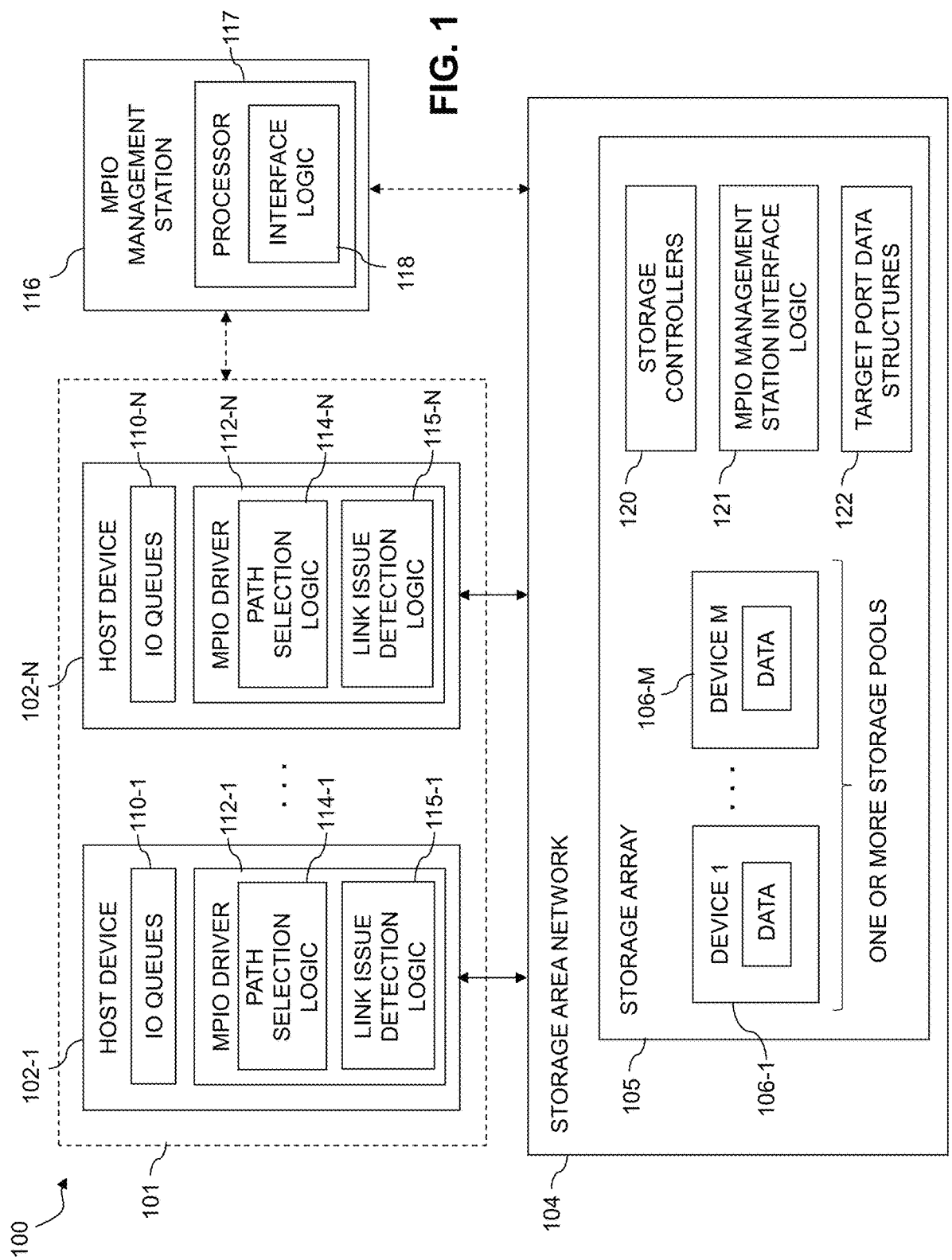
FIG. 1 is a block diagram of an information processing system configured with functionality for detection and mitigation of link performance issues in an illustrative embodiment.

FIG. 1 shows an information processing system 100 configured in accordance with an illustrative embodiment. The information processing system 100 comprises a computer system 101 illustratively comprising a plurality of host devices 102-1, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools.

The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 over the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands of a SCSI access protocol and/or Non-Volatile Memory Express (NVMe) commands of an NVMe access protocol, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand (IB), Gigabit Ethernet or Fibre Channel (FC). Numerous alternative networking arrangements are possible in a given embodiment, as will be appreciated by those skilled in the art.

The host devices 102 comprise respective sets of IO queues 110-1, . . . 110-N and respective MPIO drivers 112-1, . . . 112-N. The MPIO drivers 112 collectively comprise a multi-path layer of the host devices 102. Path selection functionality for delivery of IO operations from the host devices 102 to the storage array 105 is provided in the multi-path layer by respective instances of path selection logic 114-1, . . . 114-N implemented within the MPIO drivers 112. The multi-path layer further provides functionality for detection and mitigation of link performance issues as disclosed herein. Such functionality is provided at least in part using respective instances of link issue detection logic 115-1, . . . 115-N implemented within the MPIO drivers 112.

The MPIO drivers 112 may comprise, for example, otherwise conventional MPIO drivers, such as PowerPath® drivers from Dell Technologies, suitably modified in the manner disclosed herein to provide functionality for detection and mitigation of link performance issues. Other types of MPIO drivers from other driver vendors may be suitably modified to incorporate functionality for detection and mitigation of link performance issues as disclosed herein.

The host devices 102 can include additional or alternative components. For example, in some embodiments, the host devices 102 comprise respective local caches, implemented using respective memories of those host devices. A given such local cache can be implemented using one or more cache cards, possibly implementing caching techniques such as those disclosed in U.S. Pat. Nos. 9,201,803, 9,430,368 and 9,672,160, each entitled "System and Method for Caching Data," and incorporated by reference herein. A wide variety of different caching techniques can be used in other embodiments, as will be appreciated by those skilled in the art. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

The system 100 further comprises an MPIO management station 116 that includes a processor 117 implementing interface logic 118. The interface logic 118 is utilized to communicate with the host devices 102 and the storage array 105. Such an MPIO management station 116 provides management functionality for the multi-path layer comprising the MPIO drivers 112 of the host devices 102. In some embodiments, host device management software executing on the MPIO management station 116 interacts with storage array management software executing on the storage array 105. The MPIO management station 116, or portions thereof, may be considered in some embodiments as forming part of what is referred to herein as a "multi-path layer" that includes the MPIO drivers 112 of the host devices 102. The term "multi-path layer" as used herein is intended to be broadly construed and may comprise, for example, an MPIO layer or other multi-path software layer of a software stack, or more generally multi-pathing software program code, running on one or more processing devices each comprising at least one processor and at least one memory.

The MPIO management station 116 is an example of what is more generally referred to herein as an "external server" relative to the storage array 105. Additional or alternative external servers of different types can be used in other embodiments. In some embodiments, one or more external servers, such as the MPIO management station 116, perform at least a portion of the functionality for detection and mitigation of link performance issues as disclosed herein, illustratively in cooperation with the storage array 105 and the instances of link issue detection logic 115 of the respective MPIO drivers 112.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

A given IO operation is therefore illustratively generated by a process of an application running on the host device 102-1, and is queued in a given one of the IO queues 110-1 of the host device 102-1 with other operations generated by other processes of that application, and possibly other processes of other applications.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value. A negotiated link speed is an example of what is more generally referred to herein as a "negotiated rate."

The negotiated rates of the respective initiator and target of a particular one of the paths illustratively comprise respective negotiated data rates determined by execution of at least one link negotiation protocol for that path. The link negotiation protocol is illustratively performed separately by the initiator and the target, and involves each such component separately interacting with at least one switch of a switch fabric of the network 104 in order to determine the negotiated rate, potentially leading to substantial mismatches in initiator and target negotiated rates for the same switch, set of switches or switch fabric of the SAN 104.

The term "negotiated rate" therefore illustratively comprises a rate negotiated between an initiator or a target and a switch of a switch fabric of network 104. However, the term "negotiated rate" as used herein is intended to be broadly construed so as to also encompass, for example, arrangements that refer to negotiated speeds. Any of a wide variety of different link negotiation protocols can be used, including auto-negotiation protocols, as will be readily appreciated by those skilled in the art.

For example, some embodiments are configured to utilize link negotiation protocols that allow negotiation of data rates, such as 1G, 2G, 4G, 8G, 16G, 32G, 64G and 128G, where G denotes Gigabits per second (Gb/sec). The link bandwidth is illustratively specified in terms of Megabytes per second (MB/sec), and the actual amount of data that can be sent over the link in practice is typically somewhat lower than the negotiated data rate. Accordingly, a negotiated rate of 1G in some systems may correspond to an actual achievable data rate that is lower than 100 MB/sec, such as a rate of 85 MB/sec. Other negotiated rates referred to herein are denoted in terms of Gigabytes per second (GB/sec).

The term "negotiated rate" as used herein is therefore intended to be broadly construed, so as to encompass, for example, a theoretical negotiated rate or an actual achievable data rate that corresponds to the theoretical negotiated rate within a given system.

It is also to be appreciated that a wide variety of other types of rate negotiation may be performed in other embodiments.

As indicated previously, problems can arise when paths from one or more of the host devices 102 to the storage array 105 experience performance degradations. For example, such link performance issues can include "flaky" links that exhibit intermittent IO failures, possibly attributable to hardware problems in the SAN 104. It should be noted that references herein to IO failures or other link performance issues arising "in a SAN" are intended to be broadly construed, and in some embodiments can include link performance issues that are at least in part attributable to HBAs, storage array target ports, or other initiator and/or target components associated with the SAN 104 in the system 100.

In some embodiments, "flaky" links are links which exhibit intermittent IO failures when IOs are sent on them. As noted above, intermittent IO failures can be caused due to faulty hardware in the SAN, and can result in the IO being retried on another available path. Retry of IO to another path would result in degradation of application IO performance. A "flaky" link can be caused by problems in any SAN component, such as a switch port of one or more switch fabrics, but can additionally or alternatively be attributable to a problem in a host HBA or a target port of a storage array. Conventional approaches to such issues often require a SAN administrator to perform manual intervention, which is costly and inefficient.

Illustrative embodiments disclosed herein are configured to automatically detect and mitigate such link performance issues, thereby overcoming the drawbacks of conventional practice, as will be described in more detail below. For example, one or more such embodiments can accurately and efficiently detect "flaky" links that exhibit intermittent IO failures attributable to hardware problems in a SAN.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1. Other MPIO driver arrangements are possible. For example, in some embodiments, an MPIO driver may be configured using a kernel-based implementation, and in such an arrangement may include only a kernel-space portion and no user-space portion.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

The MPIO management station 116 is arranged as an intermediary device relative to the host devices 102 and the storage array 105. Some communications between the host devices 102 and the storage array 105 can occur via such an intermediary device, which as indicated elsewhere herein can alternatively comprise one or more external servers. Such communications illustratively involve utilization of an out-of-band communication mechanism, such as one or more IP connections between the host devices 102 and the MPIO management station 116.

As indicated previously, the host devices 102 communicate directly with the storage array 105 using one or more storage access protocols such as SCSI, Internet SCSI (iSCSI), SCSI over FC (SCSI-FC), NVMe over FC (NVMe/FC), NVMe over Fabrics (NVMeF), NVMe over TCP (NVMe/TCP), and/or others. The MPIO management station 116 in some embodiments is similarly configured to communicate directly with the storage array 105 using one or more such storage access protocols.

The MPIO driver 112-1 on the host device 102-1 illustratively has connectivity to the MPIO management station 116. The MPIO management station 116 in some embodiments implements PowerPath® Management Appliance (PPMA) functionality to obtain access to the host devices 102 and the storage array 105. The MPIO driver 112-1 can obtain from the MPIO management station 116 certain types of storage array related information for use in various operations performed at least in part by the MPIO driver 112-1, in addition to or in place of obtaining such information directly from the storage array 105. Host multi-pathing software can be used to implement a multi-path layer comprising MPIO drivers 112 of respective host devices 102 as well as related management appliance software such as the above-noted PPMA of MPIO management station 116. Such host multi-pathing software can be configured to facilitate detection and mitigation of link performance issues as disclosed herein. For example, multi-pathing software residing on one or more of the host devices 102 (e.g., a server such as an ESXi server or an AIX server) is utilized in illustrative embodiments to support detection and mitigation of link performance issues.

In the FIG. 1 embodiment, the storage array 105 comprises a plurality of storage controllers 120, MPIO management station interface logic 121, and one or more target port data structures 122 for storing negotiated rate information for different target ports of the storage array 105. In other embodiments, at least portions of one or more of the MPIO management station interface logic 121 and the corresponding target port data structures 122 can be implemented at least in part external to the storage array 105 rather than internal to the storage array 105. For example, in some embodiments at least portions of the MPIO management station interface logic 121 and corresponding target port data structures 122 are implemented on one or more servers that are external to the storage array 105.

Accordingly, such logic components and related stored information may be located internal to the storage array 105, external to the storage array 105, or implemented in part internally and in part externally to the storage array 105, and can include various combinations of hardware, firmware and software. The term "logic" as used herein is therefore intended to be broadly construed.

As indicated above, at least portions of the communications between the host devices 102 and the storage array 105 can utilize an in-band communication mechanism in which one or more predetermined commands in a designated storage access protocol are sent from the host device 102-1 to the storage array 105. Such predetermined commands can comprise, for example, read and/or write commands, sense commands (e.g., log sense and/or mode sense commands), "vendor unique" or VU commands, or combinations of multiple instances of these or other commands, in an otherwise standardized command format, such as a SCSI format, an NVMe format, or other type of format. A "command" as the term is broadly used herein can comprise a combination of multiple distinct commands.

It is also possible for the host devices 102 and the storage array 105 to communicate via one or more out-of-band communication mechanisms. For example, an out-of-band communication mechanism of this type can involve host management software of the host device 102-1 communicating with storage array management software of the storage array 105 over an IP network connection or other type of network connection. Such host management software can include software running on the MPIO management station 116, in addition to or in place of software running on the individual host devices 102.

Additional components not explicitly shown in the figure, such as one or more storage caches, may also be provided in the storage array 105 for use in processing IO operations. For example, in some embodiments, each of the storage controllers 120 has a different local cache or a different allocated portion of a global cache associated therewith, although numerous alternative arrangements are possible. The storage controllers 120 can be implemented as respective storage processors, directors or other storage system components configured to control storage system operations relating to processing of IO operations.

As indicated above, illustrative embodiments overcome various drawbacks of conventional practice by configuring the system 100 to include functionality for detection and mitigation of link performance issues, as will now be described in more detail.

In operation, the MPIO driver 112-1 is configured to control delivery of IO operations from its corresponding host device 102-1 to storage array 105 over selected ones of a plurality of paths through SAN 104, using its path selection logic 114-1, where the paths are associated with respective initiator-target pairs, the initiators being implemented on the host device 102-1 and the targets being implemented on the storage array 105.

The MPIO driver 112-1 in the present embodiment also maintains counts of IO operations for each of at least a subset of the initiator-target pairs, and responsive to detection of at least a threshold number of errors relating to the IO operations for a given one of the initiator-target pairs, determines whether or not the detected errors satisfy one or more specified conditions based at least in part on the maintained count for that initiator-target pair.

In addition, responsive to the detected errors for the given initiator-target pair satisfying the one or more specified conditions, the MPIO driver 112-1 updates link performance issue information for the given initiator-target pair, and controls delivery of additional IO operations from the host device 102-1 to the storage array 105 based at least in part on the updated link performance issue information.

At least a portion of such functionality is carried out by the link issue detection logic 115-1 of the MPIO driver 112-1, possibly in cooperation with the path selection logic 114-1. For example, the link issue detection logic 115-1 is illustratively configured to perform at least a portion of the maintaining counts of IO operations for each of the plurality of initiator-target pairs, the determining whether or not the detected errors satisfy one or more specified conditions, and the updating link performance issue information for the given initiator-target pair. The path selection logic 114-1 is illustratively configured to control delivery of additional IO operations from the host device 102-1 to the storage array 105 based at least in part on the updated link performance issue information.

The host device 102-1 is an example of what is more generally referred to herein as "at least one processing device" comprising a processor and a memory, with the processor being coupled to the memory. References herein to "at least one processing device" may instead comprise a portion of the host device 102-1, or at least a portion of multiple host devices 102, with each such host device implementing similar functionality. Other types of arrangements of one or more processing devices can be used to implement functionality for detection and mitigation of link performance issues as disclosed herein.

As indicated previously, the paths over which IO operations are delivered from the host device 102-1 to the storage array 105 under the control of the MPIO driver 112-1 are assumed to be associated with respective initiator-target pairs, with the initiators of the initiator-target pairs illustratively comprising respective HBAs of the host device 102-1 and the targets of the initiator-target pairs illustratively comprising respective storage array ports of the storage array 105. Other types of paths involving other types of initiators and targets can be used in other embodiments.

Terms such as "initiator," "target" and "initiator-target pair" as used herein are therefore intended to be broadly construed.

The MPIO driver 112-1 is illustratively further configured to maintain data structures for respective ones of the initiator-target pairs, and to store information characterizing detected errors relating to the IO operations for the initiator-target pairs in respective ones of the data structures maintained for those initiator-target pairs. An example of such a data structure will be described below in conjunction with FIG. 4.

In some embodiments, determining whether or not the detected errors satisfy one or more specified conditions based at least in part on the maintained count for that initiator-target pair comprises determining whether or not a total number of IO operations from a first detected error to a second detected error, as computed from the maintained count, is less than or equal to a specified maximum number of errors.

The first detected error illustratively comprises an initial detected error relating to the IO operations for the given initiator-target pair and the second detected error illustratively comprises a subsequent error that caused the detected errors for the given initiator-target pair to reach the threshold number of errors. Other types of detected errors can be used in determining whether or not the detected errors satisfy one or more specified conditions based at least in part on the maintained count for that initiator-target pair.

The total number of IO operations from the first detected error to the second detected error illustratively comprises a total number of IO operations for the given initiator-target pair between the first and second detected errors. Alternatively, the "total number" can include one or both of the first and second detected errors, and this term and other similar terms are therefore intended to be broadly construed herein.

In some embodiments, determining whether or not the detected errors satisfy one or more specified conditions based at least in part on the maintained count for that initiator-target pair further comprises determining whether or not the detected errors are associated with the same LUN or other logical storage volume identifier.

The MPIO driver 112-1 via its link issue detection logic 115-1 illustratively updates the link performance issue information for the given initiator-target pair to indicate the presence of a link performance issue responsive to at least (i) the total number of IO operations from the first detected error to the second detected error, as computed from the maintained count, being less than or equal to the specified maximum number of errors, and (ii) the detected errors not being associated with the same LUN or other logical storage volume identifier.

In some embodiments, determining whether or not the detected errors satisfy one or more specified conditions based at least in part on the maintained count for that initiator-target pair further comprises determining whether or not the total number of IO operations from the first detected error to the second detected error, as computed from the maintained count, is greater than the threshold number of errors.

In such an arrangement, the link performance issue information for the given initiator-target pair is illustratively updated by the MPIO driver 112-1 to indicate the presence of a link performance issue responsive to at least (i) the total number of IO operations from the first detected error to the second detected error, as computed from the maintained count, being greater than the threshold number of errors and less than or equal to the specified maximum number of errors, and (ii) the detected errors not being associated with the same LUN or other logical storage volume identifier.

The specified maximum number of errors may be computed as a function of a user-selectable value and the threshold number of errors.

Additional or alternative computations and associated processing operations may be used to determine whether or not the link performance issue information for the given initiator-target pair is updated to indicate the presence of a link performance issue.

Although described in the context of some embodiments as being performed by the MPIO driver 112-1 utilizing its path selection logic 114-1 and link issue detection logic 115-1, one or more of the above-described operations in other embodiments can be performed elsewhere within the host device 102-1. Also, other ones of the MPIO drivers 112 and their respective other host devices 102 can be similarly configured.

An example of a process including operations of the type outlined above will be described below in conjunction with the flow diagram of FIG. 2. These and other operations referred to herein as being performed by one or more host devices operating in conjunction with one or more storage arrays of a storage system can in other embodiments involve additional or alternative system components, possibly including one or more external servers such as MPIO management station 116.

As noted above, the initiators of the initiator-target pairs illustratively comprise respective HBAs of the host device 102-1 and the targets of the initiator-target pairs comprise respective storage array ports of the storage array 105.

Negotiated rates of the respective particular initiator and the corresponding target illustratively comprise respective negotiated data rates determined by execution of at least one link negotiation protocol for an associated one of the paths.

In some embodiments, at least a portion of the initiators comprise virtual initiators, such as, for example, respective ones of a plurality of N-Port ID Virtualization (NPIV) initiators associated with one or more Fibre Channel (FC) network connections. Such initiators illustratively utilize NVMe arrangements such as NVMe/FC, although other protocols can be used. Other embodiments can utilize other types of virtual initiators in which multiple network addresses can be supported by a single network interface, such as, for example, multiple media access control (MAC) addresses on a single network interface of an Ethernet network interface card (NIC). Accordingly, in some embodiments, the multiple virtual initiators are identified by respective ones of a plurality of media MAC addresses of a single network interface of a NIC. Such initiators illustratively utilize NVMe arrangements such as NVMe/TCP, although again other protocols can be used.

In some embodiments, the NPIV feature of FC allows a single host HBA port to expose multiple World Wide Numbers (WWNs) to the SAN 104 and the storage array 105. A WWN or World Wide Identifier (WWID) is a unique identifier used in various types of storage technologies that may be implemented in illustrative embodiments herein, including, for example, SCSI, NVMe, FC, Parallel Advanced Technology Attachment (PATA), Serial Advanced Technology Attachment (SATA), Serial Attached SCSI (SAS) and others, and may be viewed as an example of what is more generally referred to herein as a virtual identifier. The NPIV feature is used, for example, when there are multiple IO producers on a given host device with a need to distinguish which IO is related to which producer.

One such case is a system involving virtual machines (VMs), where multiple VMs run on a single ESXi server with HBAs. All VMs are using all HBAs but there is a need to be able to distinguish which IO belongs to which VM, for example, in order to implement service level objectives (SLOs) between the various VMs, illustratively at an OS level. Each of the NPIV initiators behaves as if it is a "normal" or physical initiator, in that it logs into a storage array port, requires masking, etc. Another example of NPIV usage is in the context of AIX servers, where different logical partitions each use a different NPIV initiator over the same host HBA port.

Accordingly, in some embodiments, multiple virtual initiators are associated with a single HBA of the host device 102-1 but have respective unique identifiers associated therewith.

Additionally or alternatively, different ones of the multiple virtual initiators are illustratively associated with respective different ones of a plurality of virtual machines of the host device that share a single HBA of the host device, or a plurality of logical partitions of the host device that share a single HBA of the host device.

Again, numerous alternative virtual initiator arrangements are possible, as will be apparent to those skilled in the art. The term "virtual initiator" as used herein is therefore intended to be broadly construed. It is also to be appreciated that other embodiments need not utilize any virtual initiators. References herein to the term "initiators" are intended to be broadly construed, and should therefore be understood to encompass physical initiators, virtual initiators, or combinations of both physical and virtual initiators.

These and other aspects of detection and mitigation of link performance issues are illustratively performed by each of the instances of link issue detection logic 115 in respective ones of the MPIO drivers 112 of the multi-path layer, possibly operating in conjunction with their corresponding instances of path selection logic 114. However, it is to be appreciated that additional system components such as MPIO management station 116 can participate in the disclosed functionality for detection and mitigation of link performance issues in illustrative embodiments. The term "link performance issue" as used herein is intended to be broadly construed, so as to encompass a wide variety of additional or alternative conditions that can adversely impact the performance of a storage system.

These and other illustrative embodiments disclosed herein provide functionality for detection and mitigation of link performance issues, with at least portions of that functionality being implemented using one or more MPIO drivers of a multi-path layer of at least one host device. The MPIO drivers can comprise PowerPath® drivers suitably modified to implement the techniques disclosed herein. Other types of host multi-pathing software from other vendors can be similarly modified to implement the techniques disclosed herein. Again, MPIO drivers are not required, and other types of host drivers or more generally other host device components can be used.

As described above, in illustrative embodiments disclosed herein, the host devices 102 are configured to interact with storage array 105 to provide detection and mitigation of link performance issues between host devices 102 and storage array 105.

An example of an algorithm performed by a given one of the host devices 102-1 utilizing its MPIO driver 112-1 and its corresponding instances of path selection logic 114-1 and link issue detection logic 115-1 will now be described. In the following description, a host device is also referred to herein as simply a "host." Similarly, a storage array is also referred to herein as simply an "array." It is assumed that the MPIO driver 112-1 maintains one or more data structures, such as the data structure of FIG. 4, and possibly additional or alternative data structures, providing information regarding initiator-target pairs. For example, the one or more data structures are illustratively utilized by the MPIO driver 112-1 to maintain counts of IO operations for each of the initiator-target pairs, as well as information regarding detected IO errors for those initiator-target pairs, on a per initiator-target pair basis.

The example algorithm illustratively includes the following steps, illustratively performed by the MPIO driver 112-1 for a given initiator-target pair, although it is to be appreciated that additional or alternative steps, possibly involving additional or alternative system components, can be used in other embodiments:

1. Increment an IO counter for each IO getting dispatched on the initiator-target pair.

2. Maintain a list of IO errors relating to the initiator-target pair. The list can include details such as the IO instance number for each IO which failed, the reason for the IO failure, and the logical storage device (e.g., LUN) on which the IO failed. The list of IO errors for the initiator-target pair is illustratively maintained in the form of at least a portion of a table or other data structure of the type mentioned previously.

3. When the MPIO driver 112-1 detects an IO error occurring on the initiator-target pair, it will capture the corresponding details into the list.

4. A threshold number of errors (e.g., six errors) for the initiator-target pair would trigger a determination as to whether or not the paths associated with the initiator-target pair should be designated as "flaky." This threshold number of errors and other thresholds referred to elsewhere herein can be user-configurable to control the desired level of sensitivity for a given implementation. These and other references herein to a "flaky" designation for an initiator-target pair should be viewed as an example of what is more generally referred to herein as a "link performance issue."

5. The difference in number of IO operations between the last detected IO error in the list and the first detected IO error in the list is calculated when the threshold number of errors is reached.

6. The determination as to whether or not the paths associated with the initiator-target pair should be designated as "flaky" is then made based on the following computations:

N=Threshold number of detected IO errors for triggering a "flaky" link determination process on an initiator-target pair $IO_{TOT}=IO_N-IO_1$=Total number of IOs sent on the initiator-target pair over the course of the N detected IO errors T=1000=Threshold number of IOs for each IO error, user configurable NT=N*T=Total number of IOs for N errors LUN_ID=Identifier of LUN for which a corresponding IO error was detected The LUN_ID stored with the IO error instance is used to determine if the IO error occurred for the same logical storage device or a different logical storage device, relative to similar information captured for other detected IO errors for the initiator-target pair. This allows the algorithm to differentiate, for example, between a storage volume connectivity issue and a path connectivity issue. For certain types of errors unrelated to path connectivity, the algorithm does not designate other paths associated with the initiator-target pair as "flaky."

It should be noted in this regard that there are mechanisms available in the SCSI and NVME standards to detect a logical storage device error or a link error. For example, logical storage device errors generally occur on the storage array and result in IO errors that are notified to the host with corresponding sense data in the form of a status code in accordance with the SCSI and NVME standards.

In the present embodiment, the paths associated with the initiator-target pair are designated as "flaky" when:

$IO_{TOT}>N$

&& $IO_{TOT}<=NT$

&& LUN_ID reported is not the same

Additional or alternative criteria can be used in the determination as to whether or not paths associated with the initiator-target pair are designated as "flaky." The designation would typically apply to all of the paths associated with the initiator-target pair.

7. The MPIO driver 112-1 adjusts its path selection for additional IOs directed from the host device 102-1 to the storage array 105 based on the above-described designation for the initiator-target pair.

As mentioned previously, the above steps are performed for each of a plurality of initiator-target pairs in the system 100.

It is to be appreciated that the particular steps of the algorithm described above are presented by way of illustrative example only, and additional or alternative steps can be used in other embodiments. Also, the order of the steps can be varied, and/or at least some of the steps can be performed at least in part in parallel with one another.

These and other embodiments disclosed herein can accurately and efficiently detect "flaky" links that exhibit intermittent IO failures attributable to hardware problems in a SAN or other link performance issues.

Moreover, such embodiments provide an approach that does not require the host OS and HBAs to be configured to consume particular types of notifications, such as Fabric Performance Impact Notifications (FPINs) used in the Fibre Channel standard. Accordingly, a significant advantage of illustrative embodiments is that the disclosed techniques for detection and mitigation of link performance issues can be readily implemented using a wide variety of different host OS and HBA types and configurations, and therefore do not require costly and disruptive upgrades of the host OS and HBAs to FPIN-consuming arrangements.

Illustrative embodiments can be implemented, for example, in one or more MPIO drivers of one or more host devices, with such MPIO drivers collectively providing a multi-path layer of the host devices.

For example, some embodiments are implemented though modification of otherwise conventional multi-pathing software, such as PowerPath® drivers commercially available from Dell Technologies. Other embodiments can be implemented in other MPIO drivers from other multi-pathing software vendors.

Illustrative embodiments disclosed herein can provide detection and mitigation of link performance issues for a wide variety of different types of host devices, such as host devices comprising ESXi servers or AIX servers.

At least portions of the above-described algorithms and other related techniques and functionality disclosed herein are illustratively implemented by a given MPIO driver on a corresponding host device, and similarly by other MPIO drivers on respective other host devices. Such MPIO drivers illustratively form a multi-path layer or MPIO layer comprising multi-pathing software of the host devices. Other types of multi-pathing software and host drivers can be used in other embodiments. Additionally or alternatively, other host device components can be used to implement at least portions of the disclosed functionality for detection and mitigation of link performance issues.

Additional examples of arrangements for detection and mitigation of link performance issues will be described elsewhere herein in conjunction with the embodiments of FIGS. 2 through 5. Other types of arrangements for detection and mitigation of link performance issues can be used in other embodiments.

These and other functions related to detection and mitigation of link performance issues that are referred to herein as being performed by or under the control of the MPIO drivers 112 through interaction with the storage array 105 can in some embodiments be performed at least in part outside of MPIO drivers 112 utilizing other system components.

The above-described functions associated with detection and mitigation of link performance issues in the MPIO driver 112-1 in some embodiments are carried out at least in part under the control of its link issue detection logic 115-1, illustratively operating in cooperation with path selection logic 114-1. For example, the link issue detection logic 115-1 is illustratively configured to control performance of portions of an algorithm comprising the steps of the process in the flow diagram to be described below in conjunction with FIG. 2. In other embodiments, one or more such steps can be more generally performed by the host device 102-1.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver IO operations from its corresponding one of the sets of IO queues 110 to the storage array 105 over selected paths through the SAN 104, and to perform the disclosed functionality for detection and mitigation of link performance issues.

Accordingly, functionality described above in the context of the first MPIO driver 112-1 and the first host device 102-1 is assumed to be similarly performed by each of the other MPIO drivers 112 and/or more generally by their respective host devices 102.

The MPIO drivers 112 may be otherwise configured utilizing well-known multi-pathing software functionality. Such conventional multi-pathing software functionality is suitably modified in illustrative embodiments disclosed herein to support detection and mitigation of link performance issues.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVMe Specification, Revision 1.3, May 2017, which is incorporated by reference herein. Other NVMe storage access protocols of this type that may be utilized in illustrative embodiments disclosed herein include NVMe/FC, NVMeF and NVMe/TCP.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105. Process tags may be used in assigning different ones of the IO operations to different ones of the IO operation priority queues, as disclosed in U.S. Pat. No. 10,474,367, entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks, using interfaces and protocols as previously described. Numerous other interfaces and associated protocols can be used in other embodiments.

The storage array 105 in some embodiments may be implemented as part of cloud infrastructure in the form of a cloud-based system. Such a cloud-based system can additionally or alternatively be used to implement other portions of system 100, such as the host devices 102 and the MPIO management station 116.

The storage devices 106 of the storage array 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more Unity™ or PowerMax™ storage arrays, commercially available from Dell Technologies.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, and MPIO drivers 112, including their corresponding instances of path selection logic 114 and link issue detection logic 115, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2. The process as shown includes steps 200 through 208, and is suitable for use in the system 100 but is more generally applicable to other types of systems comprising at least one host device and a storage system. The storage system in this embodiment is assumed to comprise at least one storage array having a plurality of storage devices. The storage devices can include logical storage devices such as LUNs or other logical storage volumes.

Figure 2:
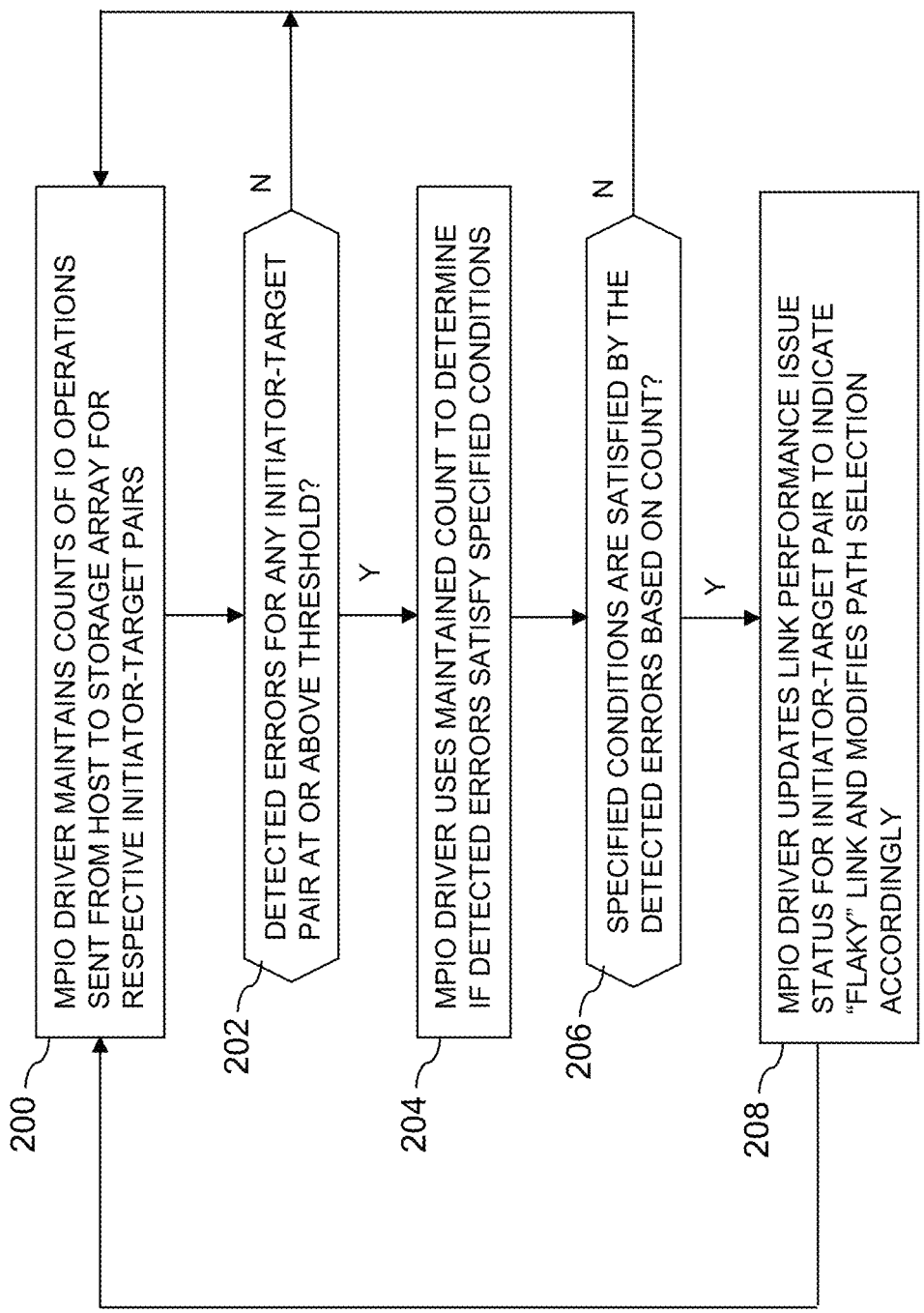
FIG. 2 is a flow diagram of a process for detection and mitigation of link performance issues in an illustrative embodiment.

The steps of the FIG. 2 process are illustratively performed at least in part by or under the control of a multi-path layer comprising one or more MPIO drivers of respective host devices, cooperatively interacting with a storage array or other storage system, and possibly some participation by one or more additional components such as an external server comprising an MPIO management station. Other arrangements of additional or alternative system components can be configured to perform at least portions of one or more of the steps of the FIG. 2 process in other embodiments.

The steps shown in FIG. 2 more specifically relate to processing performed by a given host device, also referred to in the following description as simply a "host," interacting with a storage array, and possibly an MPIO management station. It is assumed that similar processes are implemented for each of a plurality of additional hosts that interact with the storage array. An MPIO management station is not required in this embodiment and other illustrative embodiments disclosed herein.

In step 200, an MPIO driver on a host maintains counts of IO operations that it sends from the host to a storage array for respective initiator-target pairs. For example, the MPIO driver of the host illustratively obtains an IO operation from an application executing on the host and sends the IO operation from the host to the storage array over a selected path associated with a given initiator-target pair. It is assumed in the present embodiment that the MPIO driver of the host device delivers IO operations, such as read requests and write requests in the form of corresponding storage access protocol commands, from the host device to the storage array over selected paths through a SAN.

In step 202, a determination is made by the MPIO driver as to whether or not detected errors for any initiator-target pair are at or above a designated threshold. The determination is illustratively made based on errors detected over a specified monitoring time period. Responsive to an affirmative determination, the process moves to step 204, and otherwise returns to step 200 as indicated.

In step 204, the MPIO driver uses the maintained count for a given one of the initiator-target pairs having detected errors at or above the threshold to determine if the detected errors for that initiator-target pair satisfy one or more specified conditions. It should be noted that multiple distinct initiator-target pairs could be identified in step 202 as having detected errors at or above the threshold, in which case the determination in step 204 and one or more subsequent operations of the FIG. 2 process are performed for each such initiator-target pair.

In step 206, the MPIO driver determines whether or not the specified conditions are satisfied by the detected errors based on the maintained count. Responsive to an affirmative determination, the process moves to step 208, and otherwise returns to step 200 as indicated.

In step 208, the MPIO driver updates link performance issue status for the initiator-target pair for which the detected errors were determined to have satisfied the one or more specified conditions based on the maintained count in step 206. The link performance issue status is illustratively updated to indicate a "flaky" link, such as a link that is experiencing intermittent errors, and modifies its path selection accordingly.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for detection and mitigation of link performance issues. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different arrangements for detection and mitigation of link performance issues within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
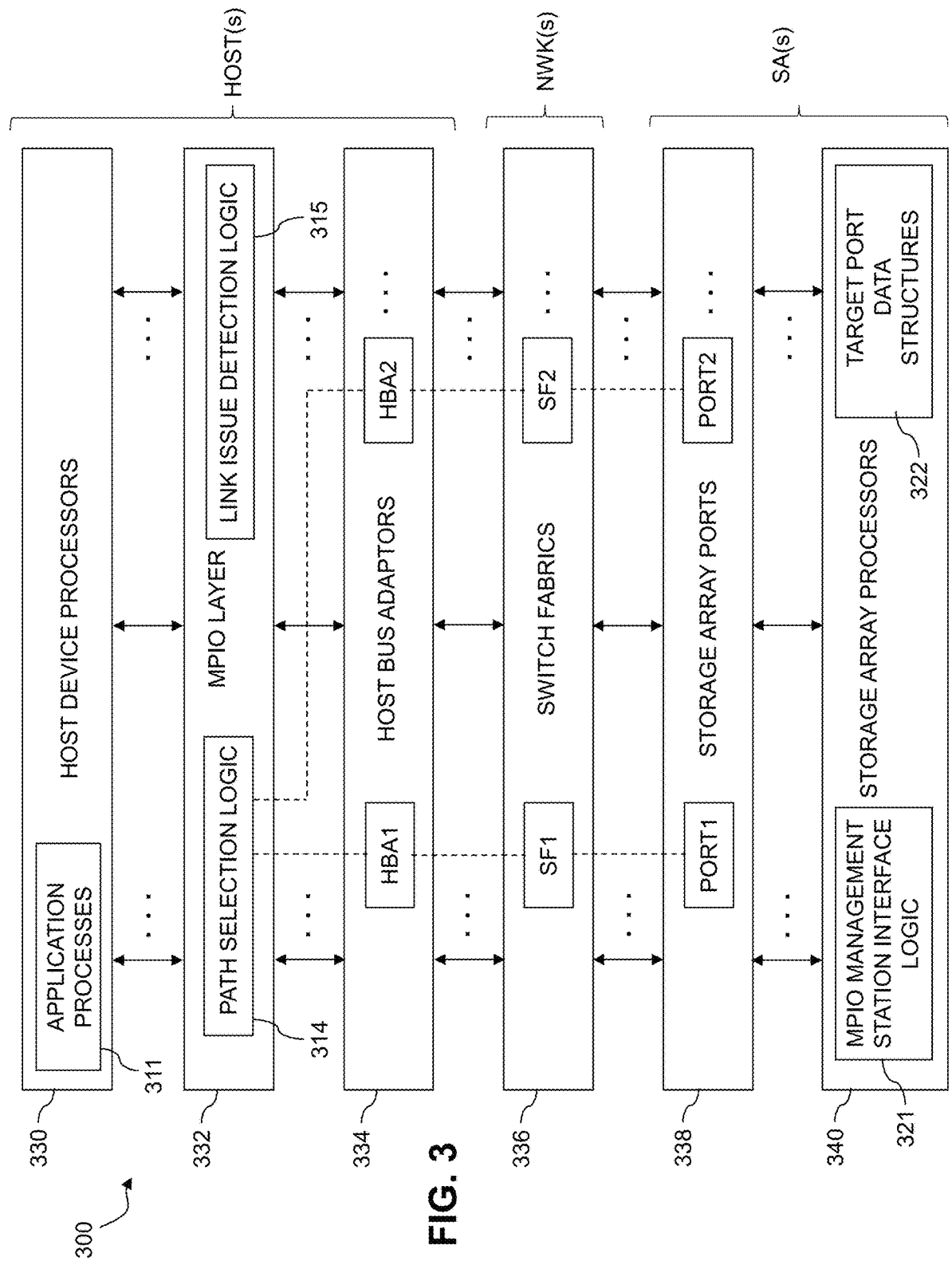
FIG. 3 is a block diagram showing multiple layers of a layered system architecture that incorporates functionality for detection and mitigation of link performance issues in an illustrative embodiment.

Referring now to FIG. 3, another illustrative embodiment is shown. In this embodiment, an information processing system 300 comprises host-side elements that include application processes 311, path selection logic 314 and link issue detection logic 315, and storage-side elements that include MPIO management station interface logic 321 and one or more target port data structures 322 for storing negotiated rate information for respective target ports of at least one storage array. There may be separate instances of one or more such elements associated with each of a plurality of storage arrays of the system 300.

The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs"). The storage array processors of the storage array processor layer 340 may be viewed as corresponding to one or more storage controllers such as the storage controllers 120 of the storage array 105.

The application processes 311 of the host device processor layer 330 generate IO operations that are processed by the MPIO layer 332 for delivery to the one or more storage arrays over the SAN comprising switch fabrics of switch fabric layer 336, using detection and mitigation of link performance issues as disclosed herein. Paths are determined by the path selection logic 314 for sending such IO operations to the one or more storage arrays.

The MPIO layer 332 is an example of what is also referred to herein as a multi-path layer, and comprises one or more MPIO drivers implemented in respective host devices. Each such MPIO driver illustratively comprises respective instances of path selection logic 314 and link issue detection logic 315 configured as previously described. Additional or alternative layers and logic arrangements can be used in other embodiments.

In a manner similar to that described elsewhere herein, the MPIO layer 332 comprising link issue detection logic 315 illustratively processes a plurality of IO operations generated by a given host device. The IO operations are sent by the MPIO layer 332 to a storage array over respective paths selected using one or more algorithms implemented by path selection logic 314.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of k paths to a shared storage array, or alternatively different ones of the host devices can have different numbers and types of paths to the storage array.

The path selection logic 314 of the MPIO layer 332 in this embodiment selects paths for delivery of IO operations to the one or more storage arrays having the storage array ports of the storage array port layer 338. More particularly, the path selection logic 314 determines appropriate paths over which to send particular IO operations to particular logical storage devices of the one or more storage arrays.

In an example process for detection and mitigation of link performance issues in the system 300, an MPIO driver of the MPIO layer 332 maintains counts of IO operations for each of a plurality of initiator-target pairs. The initiators illustratively comprise respective HBAs implemented on the corresponding host device, and the targets illustratively comprise storage array ports of the one or more storage arrays. Each initiator-target pair is associated with a corresponding subset of a plurality of paths between the host device and the one or more storage arrays. Responsive to detection of at least a threshold number of errors relating to the IO operations for a given one of the initiator-target pairs, the MPIO driver via its link issue detection logic 315 determines whether or not the detected errors satisfy one or more specified conditions based at least in part on the maintained count for that initiator-target pair, and responsive to the detected errors for the given initiator-target pair satisfying the one or more specified conditions, updates link performance issue information for the given initiator-target pair. The MPIO driver then controls delivery of additional IO operations from the host device to the one or more storage arrays based at least in part on the updated link performance issue information. This illustratively involves adjusting one or more parameters utilized by a path selection algorithm implemented by path selection logic 314.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of IO host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Referring now to FIG. 4, an example data structure 400 utilized in providing detection and mitigation of link performance issues as disclosed herein is shown.

In the example data structure 400, which is illustratively maintained by an instance of the link issue detection logic 115 in one of the MPIO drivers 112 of the FIG. 1 embodiment or the link issue detection logic 315 in an MPIO driver of the MPIO layer 332 of the FIG. 3 embodiment, the MPIO driver stores IO error information and link performance issue status for a particular initiator-target pair i.

The example data structure 400 more particularly comprises a plurality of entries for respective IO errors detected for the particular initiator-target pair i. The IO error entries are illustratively denoted IO Error 1, IO Error 2, . . . IO Error P, and for each such entry, the data structure 400 further stores a LUN identifier (ID) that indicates the particular LUN to which the IO operation that resulted in the detected error was directed, and other information characterizing the detected error. The variable P illustratively denotes a total number of errors detected for the initiator-target pair in a corresponding monitoring period, and may be viewed as an example of a "count" of detected errors, maintained in a host device, as that term is broadly used herein. Other types of counts and associated count maintenance arrangements can be used in other embodiments. In addition, the data structure 400 includes an entry for storing the current link performance issue status for the particular initiator-target pair i. This entry could store, for example, a current value of a binary indicator that specifies whether or not a link associated with the particular initiator-target pair i is a "flaky" link or is otherwise experiencing intermittent errors. Other types of link performance issue status indicators could be used, such as multi-bit indicators that specify which of a plurality of possible link performance issues, if any, is currently being experienced by the particular initiator-target pair i.

The particular data structure arrangement shown in FIG. 4 is only an example, and numerous other types and arrangements of data structures can be utilized in other embodiments for storing counts, detected error information and link performance issue status, as well as additional or alternative information.

Figure 5:
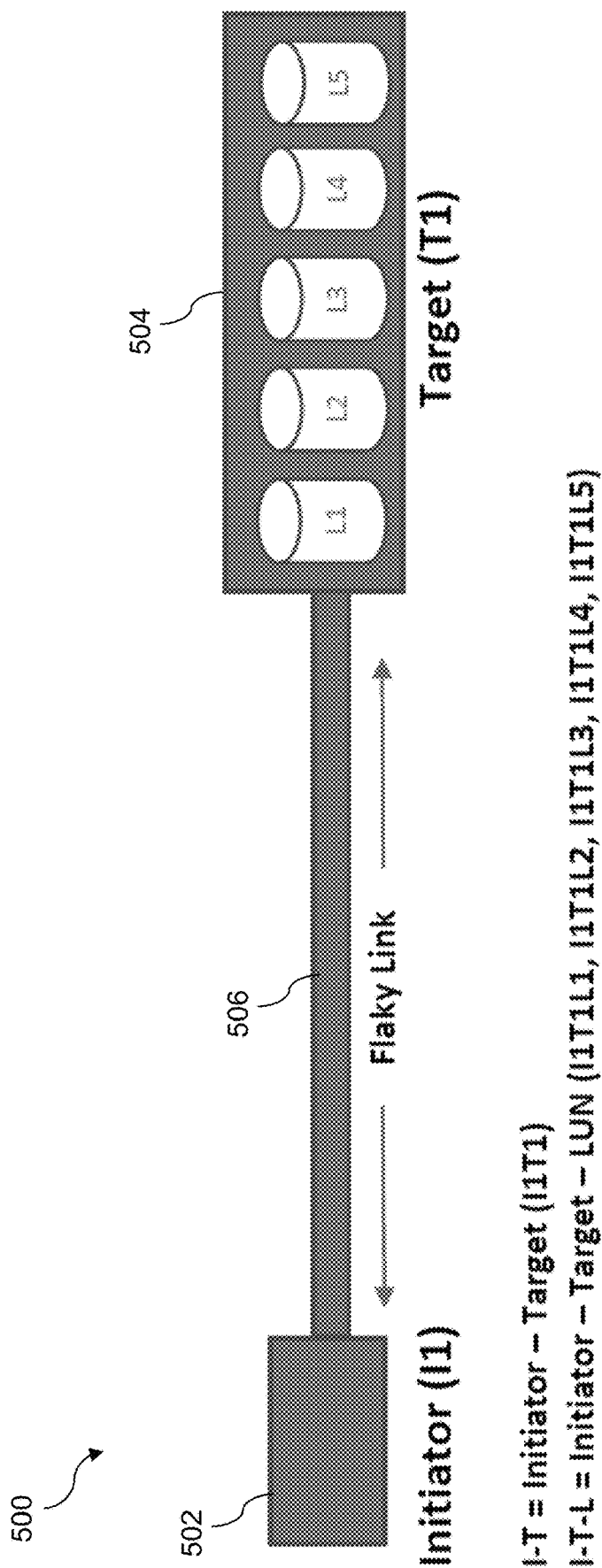
FIG. 5 shows an example of an initiator-target pair having a "flaky" link in an illustrative embodiment.

FIG. 5 shows an example of an initiator-target pair having a "flaky" link in an illustrative embodiment.

In the FIG. 5 embodiment, a portion 500 of an information processing system such as system 100 of FIG. 1 or system 300 of FIG. 3 comprises an initiator 502 and a target 504 that communicate over a link 506 that is exhibiting intermittent errors or other types of "flaky" behavior, more generally referred to herein as link performance issues. The initiator 502 is also designated as I1, and the target 504 is also designated as T1. The initiator-target pair in this embodiment is referred to as I1T1. The target 504 is associated with multiple logical storage volumes, namely, a plurality of LUNs denoted as L1, L2, L3, L4 and L5 as illustrated. The portion 500 of the FIG. 5 system therefore includes multiple initiator-target-LUN ("I-T-L") combinations, denoted as I1T1L1, I1T1L2, I1T1L3, I1T1L4 and I1T1L5, for the LUNs L1, L2, L3, L4 and L5, respectively. These LUNs are part of a storage array that includes the target 504 and are accessed via the link 506 from a host device that includes the initiator 502. Although the LUNs L1 through L5 are shown in the figure as being within the target 504, this is for simplicity of illustration only, as the LUNs represent logical storage volumes that are accessible through the target but are more generally part of the storage array.

The link detection and mediation techniques disclosed herein are illustratively implemented in an MPIO driver of the host device to detect IO errors for IOs directed to multiple ones of the LUNs of the target 504 and to apply an algorithm of the type described elsewhere herein to designate the link 506 as a "flaky" link. As such IO errors are illustratively distributed over the multiple LUNs of the target 504, the link performance issue might otherwise be very difficult to detect, particularly if the initiator-target pair includes a large number of paths, absent use of the techniques disclosed herein. For example, under conventional practice, IO errors attributable to the SAN may be viewed as being attributable to the individual LUNs, thereby masking the link connectivity issue. Illustrative embodiments overcome these and other problems, without requiring that the host device OS and HBAs be upgraded to consume FPINs from the SAN switch fabrics.

Responsive to designation of a particular link such as link 506 as a "flaky" link, the MPIO driver of the host device illustratively at least temporarily modifies its path selection algorithm to avoid the link 506. The link 506 can be reevaluated after a particular time period and its link performance issue status updated as necessary based on resolution of the problems that led to its previous designation as a "flaky" link.

Accordingly, IO error based evaluations of the type implemented by the algorithms disclosed herein can be repeated, periodically or under other specified conditions, in order to ensure continued efficient performance of the system.

The above-described processes, algorithms and other features and functionality disclosed herein are presented by way of illustrative example only, and other embodiments can utilize additional or alternative arrangements.

Also, as mentioned previously, different instances of the above-described processes, algorithms and other techniques for detection and mitigation of link performance issues can be performed using different system components.

For example, various aspects of functionality for detection and mitigation of link performance issues in some embodiments can be implemented at least in part using one or more servers that are external to a storage array 105 or other type of storage system. Also, processing logic can be implemented using other types of host drivers, such as, for example, iSCSI drivers, or more generally other host device components.

The particular arrangements described above for detection and mitigation of link performance issues are therefore presented by way of illustrative example only. Numerous alternative arrangements of these and other features can be used in implementing the detection and mitigation of link performance issues in other illustrative embodiments.

As indicated previously, the illustrative embodiments disclosed herein can provide a number of significant advantages relative to conventional arrangements.

For example, some embodiments are advantageously configured to provide highly efficient and effective detection and mitigation of link performance issues between host devices and a storage array or other storage system.

These embodiments can avoid the disadvantages of conventional techniques such as manual intervention by a SAN administrator or upgrading host OS and HBAs to a FPIN-consuming implementation.

Accordingly, illustrative embodiments can avoid the need to alter the host devices to process enhanced congestion notifications such as FPINs received from next-generation switch fabrics, while also potentially avoiding the need to upgrade the system to the next-generation switch fabrics in the first place.

Various aspects of functionality associated with detection and mitigation of link performance issues as disclosed herein can be implemented in a host device, in a storage system, or partially in a host device and partially in a storage system, and additionally or alternatively using other arrangements of one or more processing devices each comprising at least a processor and a memory coupled to the processor.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems implemented at least in part using virtualization infrastructure such as virtual machines and associated hypervisors. For example, virtual machines provided in such systems can be used to implement a fast tier or other front-end tier of a multi-tier storage system in illustrative embodiments. A capacity tier or other back-end tier of such a multi-tier storage system can be implemented using one or more object stores.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system.

Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 and link issue detection logic 115 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, initiators, targets, path selection logic, link issue detection logic, interface logic, data structures, and additional or alternative components. Also, the particular configurations of system and device elements and associated processing operations illustratively shown in the drawings can be varied in other embodiments. For example, a wide variety of different host device and storage system configurations and associated arrangements for detection and mitigation of link performance issues can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured:
   to control delivery of input-output operations from a host device to a storage system over selected ones of a plurality of paths through a network;
   to maintain counts of input-output operations for each of a plurality of initiator-target pairs, the initiators being implemented on the host device and the targets being implemented on the storage system, each initiator-target pair being associated with a corresponding subset of the plurality of paths;
   responsive to detection of at least a threshold number of errors relating to the input-output operations for a given one of the initiator-target pairs, to determine whether or not the detected errors satisfy one or more specified conditions based at least in part on the maintained count for that initiator-target pair; and
   responsive to the detected errors for the given initiator-target pair satisfying the one or more specified conditions, to update link performance issue information for the given initiator-target pair;
   wherein delivery of additional input-output operations from the host device to the storage system is controlled based at least in part on the updated link performance issue information; and
   wherein determining whether or not the detected errors satisfy one or more specified conditions based at least in part on the maintained count for that initiator-target pair comprises determining whether or not the detected errors are associated with a same logical storage volume identifier.

2. The apparatus of claim 1 wherein the at least one processing device comprises at least a portion of the host device.

3. The apparatus of claim 1 wherein the initiators of the initiator-target pairs comprise respective host bus adaptors of the host device and the targets of the initiator-target pairs comprise respective storage array ports of the storage system.

4. The apparatus of claim 1 wherein the at least one processing device is further configured:
to maintain data structures for respective ones of the initiator-target pairs; and
to store information characterizing detected errors relating to the input-output operations for the initiator-target pairs in respective ones of the data structures maintained for those initiator-target pairs.

5. The apparatus of claim 1 wherein said at least one processing device comprises a multi-path input-output driver of the host device, with the multi-path input-output driver of the host device being configured to control the delivery of the input-output operations from the host device to the storage system over the selected ones of the plurality of paths through the network.

6. The apparatus of claim 5 wherein the multi-path input-output driver is further configured to perform at least a portion of the maintaining counts of input-output operations for each of the plurality of initiator-target pairs, the determining whether or not the detected errors satisfy one or more specified conditions, and the updating link performance issue information for the given initiator-target pair.

7. The apparatus of claim 1 wherein determining whether or not the detected errors satisfy one or more specified conditions based at least in part on the maintained count for that initiator-target pair further comprises determining whether or not a total number of input-output operations from a first detected error to a second detected error, as computed from the maintained count, is less than or equal to a specified maximum number of errors.

8. The apparatus of claim 7 wherein the first detected error comprises an initial detected error relating to the input-output operations for the given initiator-target pair and the second detected error comprises a subsequent error that caused the detected errors for the given initiator-target pair to reach the threshold number of errors.

9. The apparatus of claim 7 wherein the total number of input-output operations from the first detected error to the second detected error comprises a total number of input-output operations for the given initiator-target pair between the first and second detected errors.

10. The apparatus of claim 7 wherein the link performance issue information for the given initiator-target pair is updated to indicate the presence of a link performance issue responsive to at least (i) the total number of input-output operations from the first detected error to the second detected error, as computed from the maintained count, being less than or equal to the specified maximum number of errors, and (ii) the detected errors not being associated with the same logical storage volume identifier.

11. The apparatus of claim 7 wherein determining whether or not the detected errors satisfy one or more specified conditions based at least in part on the maintained count for that initiator-target pair further comprises determining whether or not the total number of input-output operations from the first detected error to the second detected error, as computed from the maintained count, is greater than the threshold number of errors.

12. The apparatus of claim 11 wherein the link performance issue information for the given initiator-target pair is updated to indicate the presence of a link performance issue responsive to at least (i) the total number of input-output operations from the first detected error to the second detected error, as computed from the maintained count, being greater than the threshold number of errors and less than or equal to the specified maximum number of errors, and (ii) the detected errors not being associated with the same logical storage volume identifier.

13. The apparatus of claim 7 wherein the specified maximum number of errors is computed as a function of a user-selectable value and the threshold number of errors.

14. A computer program product comprising a non-transitory processor-readable storage medium having stored therein program code of one or more software programs, wherein the program code, when executed by at least one processing device comprising a processor coupled to a memory, causes the at least one processing device:
to control delivery of input-output operations from a host device to a storage system over selected ones of a plurality of paths through a network;
to maintain counts of input-output operations for each of a plurality of initiator-target pairs, the initiators being implemented on the host device and the targets being implemented on the storage system, each initiator-target pair being associated with a corresponding subset of the plurality of paths;
responsive to detection of at least a threshold number of errors relating to the input-output operations for a given one of the initiator-target pairs, to determine whether or not the detected errors satisfy one or more specified conditions based at least in part on the maintained count for that initiator-target pair; and
responsive to the detected errors for the given initiator-target pair satisfying the one or more specified conditions, to update link performance issue information for the given initiator-target pair;
wherein delivery of additional input-output operations from the host device to the storage system is controlled based at least in part on the updated link performance issue information; and
wherein determining whether or not the detected errors satisfy one or more specified conditions based at least in part on the maintained count for that initiator-target pair comprises determining whether or not the detected errors are associated with a same logical storage volume identifier.

15. The computer program product of claim 14 wherein determining whether or not the detected errors satisfy one or more specified conditions based at least in part on the maintained count for that initiator-target pair further comprises determining whether or not a total number of input-output operations from a first detected error to a second detected error, as computed from the maintained count, is less than or equal to a specified maximum number of errors.

16. The computer program product of claim 15 wherein the first detected error comprises an initial detected error relating to the input-output operations for the given initiator-target pair and the second detected error comprises a subsequent error that caused the detected errors for the given initiator-target pair to reach the threshold number of errors.

17. A method comprising:
controlling delivery of input-output operations from a host device to a storage system over selected ones of a plurality of paths through a network;
maintaining counts of input-output operations for each of a plurality of initiator-target pairs, the initiators being implemented on the host device and the targets being implemented on the storage system, each initiator-target pair being associated with a corresponding subset of the plurality of paths;

responsive to detection of at least a threshold number of errors relating to the input-output operations for a given one of the initiator-target pairs, determining whether or not the detected errors satisfy one or more specified conditions based at least in part on the maintained count for that initiator-target pair; and responsive to the detected errors for the given initiator-target pair satisfying the one or more specified conditions, updating link performance issue information for the given initiator-target pair;

wherein delivery of additional input-output operations from the host device to the storage system is controlled based at least in part on the updated link performance issue information; and wherein determining whether or not the detected errors satisfy one or more specified conditions based at least in part on the maintained count for that initiator-target pair comprises determining whether or not the detected errors are associated with a same logical storage volume identifier.

18. The method of claim 17 wherein determining whether or not the detected errors satisfy one or more specified conditions based at least in part on the maintained count for that initiator-target pair further comprises determining whether or not a total number of input-output operations from a first detected error to a second detected error, as computed from the maintained count, is less than or equal to a specified maximum number of errors.

19. The method of claim 18 wherein the first detected error comprises an initial detected error relating to the input-output operations for the given initiator-target pair and the second detected error comprises a subsequent error that caused the detected errors for the given initiator-target pair to reach the threshold number of errors.

20. The method of claim 18 wherein the link performance issue information for the given initiator-target pair is updated to indicate the presence of a link performance issue responsive to at least (i) the total number of input-output operations from the first detected error to the second detected error, as computed from the maintained count, being less than or equal to the specified maximum number of errors, and (ii) the detected errors not being associated with the same logical storage volume identifier.

* * * * *